United States Patent
McLeod et al.

(10) Patent No.: US 11,780,939 B2
(45) Date of Patent: Oct. 10, 2023

(54) ENHANCED HEAT STABILITY POLYPROPYLENE

(71) Applicant: FINA TECHNOLOGY, INC., Houston, TX (US)

(72) Inventors: Michael McLeod, Houston, TX (US); Russell McDonald, Humble, TX (US); Joseph Shuler, League City, TX (US); Mahesh Patkar, Houston, TX (US); Marc Mayhall, Pearland, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 639 days.

(21) Appl. No.: 16/795,790

(22) Filed: Feb. 20, 2020

(65) Prior Publication Data
US 2020/0262946 A1    Aug. 20, 2020

Related U.S. Application Data

(60) Provisional application No. 62/808,152, filed on Feb. 20, 2019.

(51) Int. Cl.
| | |
|---|---|
| *C08F 10/06* | (2006.01) |
| *C08K 5/14* | (2006.01) |
| *C08K 3/34* | (2006.01) |
| *B29B 9/12* | (2006.01) |
| *C08K 5/00* | (2006.01) |
| *C08K 5/17* | (2006.01) |
| *C08K 5/53* | (2006.01) |

(52) U.S. Cl.
CPC ............... *C08F 10/06* (2013.01); *B29B 9/12* (2013.01); *C08K 3/34* (2013.01); *C08K 5/005* (2013.01); *C08K 5/14* (2013.01); *C08K 5/17* (2013.01); *C08K 5/53* (2013.01); *C08F 2810/10* (2013.01)

(58) Field of Classification Search
CPC .... C08F 110/06; C08F 10/06; C08F 2810/10; C08F 2500/12; C08K 5/14; C08K 3/34; C08K 5/005
See application file for complete search history.

(56) References Cited

U.S. PATENT DOCUMENTS

| | | | | |
|---|---|---|---|---|
| 3,558,532 A | * | 1/1971 | Sundquist | C08J 9/0095 521/145 |
| 4,822,546 A | | 4/1989 | Lohkamp | |
| 5,532,282 A | * | 7/1996 | Needham | C08L 23/0815 524/400 |
| 5,611,983 A | | 3/1997 | Ma et al. | |
| 6,160,029 A | * | 12/2000 | Chaudhary | C08L 23/10 521/139 |
| 6,194,060 B1 | * | 2/2001 | Amon | B32B 27/08 428/318.6 |
| 6,303,233 B1 | * | 10/2001 | Amon | B32B 27/32 428/910 |
| 6,326,434 B1 | * | 12/2001 | Lee | C08L 23/04 525/194 |
| 6,423,800 B1 | * | 7/2002 | Musgrave | C08K 5/14 526/348 |
| 6,855,777 B2 | * | 2/2005 | McLoughlin | C08K 5/0033 525/387 |
| 7,470,727 B2 | * | 12/2008 | Iwashita | C08F 8/50 522/158 |
| 7,659,349 B2 | * | 2/2010 | Roegiers | B29C 48/022 524/401 |
| 7,902,300 B2 | * | 3/2011 | VanDeurzen | C08J 11/22 525/387 |
| 8,232,358 B2 | | 7/2012 | Kobayashi et al. | |
| 9,365,710 B2 | * | 6/2016 | Lopez | C08L 23/16 |
| 9,527,989 B2 | * | 12/2016 | Herklots | B29C 45/00 |
| 10,538,645 B2 | * | 1/2020 | Pehlert | C08G 83/005 |
| 11,299,564 B2 | * | 4/2022 | Maj | C08F 10/06 |
| 2009/0160073 A1 | * | 6/2009 | Tollefson | B29D 11/00038 264/1.1 |
| 2010/0324225 A1 | * | 12/2010 | Zummallen | C08K 5/159 525/333.8 |
| 2011/0293869 A1 | * | 12/2011 | Myhre | C08F 8/50 526/348 |
| 2017/0051118 A1 | * | 2/2017 | McLeod | C08K 5/159 |
| 2017/0313865 A1 | * | 11/2017 | Wang | C08L 23/16 |
| 2021/0261699 A1 | * | 8/2021 | Neidhöfer | C08K 5/14 |

FOREIGN PATENT DOCUMENTS

| | | |
|---|---|---|
| EP | 2711391 A1 | 3/2014 |
| EP | 2782961 A1 | 10/2014 |
| EP | 2898016 A1 | 7/2015 |
| WO | 0042077 A1 | 7/2000 |
| WO | 2006025917 A2 | 3/2006 |
| WO | 2007126994 A1 | 11/2007 |

OTHER PUBLICATIONS

International Preliminary Report on Patentability issued in Application No. PCT/US2020/019007, dated Aug. 10, 2021, 7 pages.

* cited by examiner

*Primary Examiner* — Rip A Lee
(74) *Attorney, Agent, or Firm* — CONLEY ROSE, P.C.

(57) ABSTRACT

A process forming a high MFR polypropylene includes providing a reactor powder polypropylene, the reactor powder polypropylene having a melt flow rate of less than 100 dg/min. The process also includes mixing the reactor powder polypropylene with a free-radical initiator to form a powder/initiator mixture and subjecting the powder/initiator mixture to post-reactor forming. The present disclosure further provides for a vis-broken polypropylene and a polymer article.

25 Claims, 5 Drawing Sheets

ENHANCED HEAT STABILITY POLYPROPYLENE

CROSS REFERENCE TO RELATED APPLICATIONS

This application claims the benefit of U.S. Provisional Application No. 62/808,152, filed Feb. 20, 2019, which is incorporated herein by reference in its entirety for all purposes.

BACKGROUND

Polyolefins, particularly polypropylene, may be used in a variety of applications. Polypropylene with good thermal stability may be useful in such applications as composites and compounding. Composites may be formed by wetting a fiber, such as a glass fiber, with polypropylene. Polypropylene with good thermal stability may also be used in nonwovens, such as for automobiles and in filtration. Polypropylene with good thermal stability may also be used in durable good applications where high temperature resistance is desirable. Such durable goods include, but are not limited to, coffee makers, hair dryers, washing machines and dish washers.

SUMMARY

The present disclosure provides for a process forming a high MFR polypropylene. The process includes providing a reactor powder polypropylene, the reactor powder polypropylene having a melt flow rate of less than 100 dg/min. The process also includes mixing the reactor powder polypropylene with a free-radical initiator to form a powder/initiator mixture and subjecting the powder/initiator mixture to post-reactor forming. The present disclosure further provides for a vis-broken polypropylene and a polymer article.

BRIEF DESCRIPTION OF DRAWINGS

The present disclosure may be understood from the following detailed description when read with the accompanying figures.

DETAILED DESCRIPTION

Figure 1:
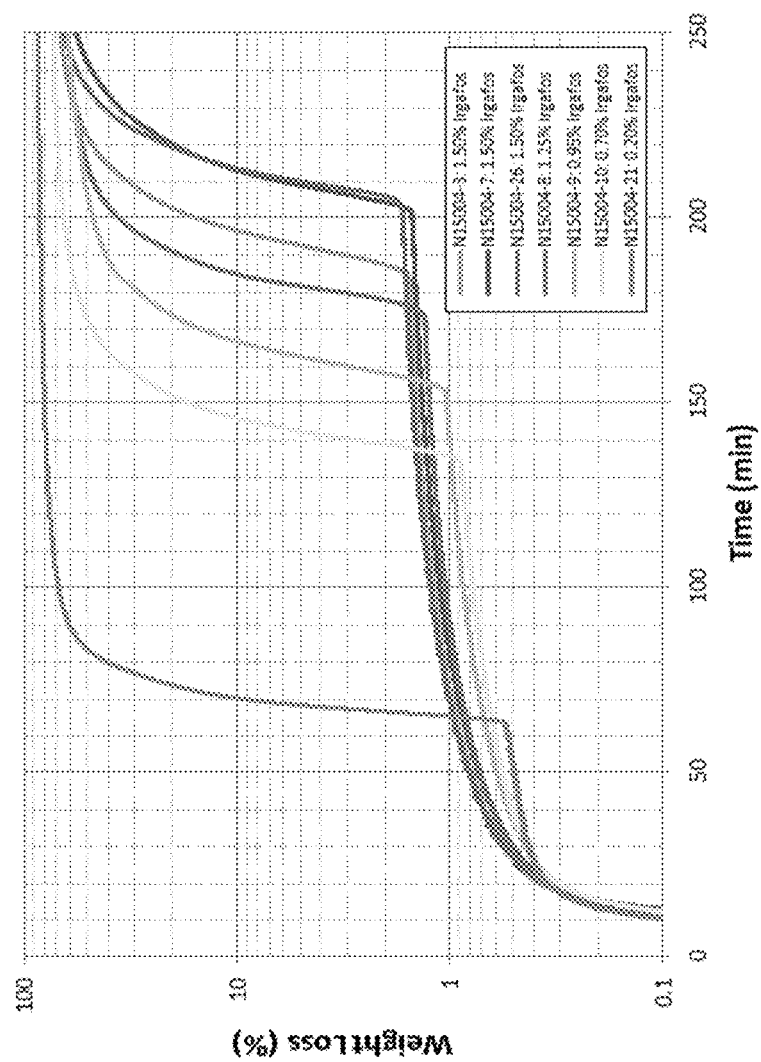
FIG. 1 is a graph of Percent Weight-Loss versus Time for Compounds with Irgafos 168 consistent with certain embodiments of the present disclosure.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Embodiments of the present disclosure generally relate to high melt flow rate controlled polypropylene with good thermal stability. Certain embodiments of the present disclosure relate to a process of forming a high melt flow rate (MFR) polypropylene with long term thermal performance characteristics, referred hereinafter as "forming a high MFR polypropylene." In such embodiments, the process of forming a high MFR polypropylene includes providing a reactor powder polypropylene and subjecting the reactor powder polypropylene to post-reactor forming. MFR is measured herein using ASTM D1238.

Reactor Powder Polymer

The reactor powder polypropylene may be a homopolymer that may contain up to 5% of another alpha-olefin, including but not limited to C2-C8 alpha-olefins such as ethylene and 1-butene. The polypropylene homopolymer may be atactic polypropylene, isotactic polypropylene, hemi-isotactic, syndiotactic polypropylene, or combinations thereof. A polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain. In hemi-isotactic polymer, every other repeat unit has a random substituent.

In certain embodiments, the reactor powder polymer is a heterophasic polypropylene. In other embodiments, the polypropylene copolymer may be a polypropylene heterophasic copolymer (PPHC) wherein a polypropylene homopolymer phase or component is joined to a copolymer phase or component. The PPHC may comprise from greater than 6.5 wt. % to less than 20 wt. % ethylene by total weight of the PPHC, alternatively from 8.5 wt. % to less than 18 wt. %, alternatively from 9.5 wt. % to less than 16%.

The copolymer phase of a PPHC may be a random copolymer of propylene and ethylene, also referred to as an ethylene/propylene rubber (EPR). PP heterophasic copolymers show distinct homopolymer phases that are interrupted by short sequences or blocks having a random arrangement of ethylene and propylene. In comparison to random copolymers, the block segments comprising the EPR may have certain polymeric characteristics (e.g., intrinsic viscosity) that differ from that of the copolymer as a whole. Without wishing to be limited by theory, the EPR portion of the PPHC has rubbery characteristics which, when incorporated within the matrix of the homopolymer component, may function to provide increased impact strength to the PPHC. In an embodiment, the EPR portion of the PPHC comprises greater than 14 wt. % of the PPHC, alternatively greater than 18 wt. % of the PPHC, alternatively from 14 wt. % to 18 wt. % of the PPHC.

The amount of ethylene present in the EPR portion of the PPHC may be from 38 wt. % to 60 wt. %, alternatively from 40 wt. % to 45 wt. % based on the total weight of the EPR portion. In an embodiment, the PPHC may have a melt flow rate (MFR) of from 1 g/10 min. to 100 g/10 min., alternatively from 1.5 g/10 min. to 50 g/10 min.

In another embodiment, the reactor powder polymer is a polypropylene homopolymer with a density of from 0.895 g/cc to 0.920 g/cc, alternatively from 0.900 g/cc to 0.915 g/cc, and alternatively from 0.905 g/cc to 0.915 g/cc as determined in accordance with ASTM D1505. In certain embodiments of the present disclosure, the propylene homopolymer may have a MFR of between 10 and less than 100 dg/min, between 20 and 90 dg/min or between 30 and 70 dg/min as measured by ASTM D1238. In certain embodiments, the MFR of the propylene homopolymer is less than 100 dg/min. U.S. Pat. No. 4,822,546 teaches that polypropylenes with a MFR above about 40 are difficult to pelletize. U.S. Patent Application No. 2017/0051118 discloses similar results with examples where 50 MFR polypropylene results in misshapen pellets. Such difficulties in pelletization increase as MFR increases from 50 dg/min. In addition, fines production may increase with higher MFRs, as shown in WO 2006025917. Polypropylenes having a MFR of 80 dg/min or greater may be difficult to manufacture, lowering production rates by 20% or more. Difficulties in pelletization of high melt flow polyolefins are described in U.S. Pat. No. 5,611,983, WO 2007126994 A1, and U.S. Pat. No. 6,423,800. Fines generation are described in U.S. Pat. No. 8,232,358, WO2006025917 and WO 2000042077.

Post-Reactor Forming

The reactor powder polypropylene may be subjected to post-reactor forming. In post-reactor forming, the reactor powder polypropylene is formed into larger, discrete particles. Post reactor forming may be accomplished by, for example, extrusion into pellets, compaction into a fused/physically bonded pellet, prill bead manufacturing, pastillation, or melt atomization.

Post-reactor forming may provide such advantages as reducing or eliminating explosion hazards found with dust handling, increasing bulk density, improving material handling, and improved product consistency such as by improving particle-to-particle consistency. Other post-reactor forming advantages may include increasing manufacturing versatility and intimate dispersion of additives within the polypropylene molecules, such as when the post-reactor forming step involves melting the polypropylene in making the larger, discrete particle.

In certain embodiments, MFR of the polypropylene is increased during post-reactor forming by mixing the reactor powder polypropylene with a free radical initiator, such as a peroxide to form a powder/initiator mixture and then subjecting the powder/initiator mixture to post-reactor forming. In certain embodiments, the peroxide is an organic peroxide. Examples of organic peroxides may include, but are not limited to, 3,6,9-triethyl-3,6,9-trimethyl-1,4,7-triperoxonane, commercially available from AKZONOBEL® under the tradename TRIGONOX® 301 (CAS #24748-23-0); 2,5-bis(tert-butylperoxy)-2,5-dimethylhexane, commercially available from AKZONOBEL® as LUPERSOL™ 101, 2,5-dimethyl 2,5 bis-(t-butylperoxy) hexyne-3 and 4 methyl 4 t-butylperoxy-2 pentanone, 3,6,6,9,9-pentamethyl-3-(ethyl acetate), 1,2,4,5-textraoxy cyclononane, 4-(t-amylperoxy)-4-methyl-2-pentanol, dihexylene glycol peroxide, 4-(t-hexylperoxy)-4-methyl-2-pentanol, 4-(t-octylperoxy)-4-methyl-2-pentanol, 2-methyl-2-t-amylperoxy-4-pentanone, di-t-butyl peroxide, di-t-hexyl peroxide; di-t-octyl peroxide, dicumyl peroxide, and α,α' bis-(tert-butylperoxy) diisopropyl benzene. In certain embodiments, where the large, discrete particle is to be free of tertiary butyl alcohols, 2,5-bis(tert-butylperoxy)-2,5-dimethylhexane is not used and 3,6,9-triethyl-3,6,9-trimethyl-1,4,7-triperoxonane is used.

The peroxide may be present in the powder/initiator mixture in an amount ranging from greater than 0 ppm to 1500 ppm, or 50 ppm to 1500 ppm, or 100 ppm to 750 ppm, or 250 ppm to 500 ppm (all by weight), for example.

Post-reactor forming of the powder/initiator mixture may result in vis-breaking of the polypropylene, resulting in an increased MFR of the vis-broken polypropylene. In certain embodiments, the vis-broken polypropylene may have a melt flow rate of 50 dg/min to 500 dg/min, from 70 dg/min to 300 dg/min or from 80 dg/min to 150 dg/min. In some embodiments, the ratio of the large, discrete particle MFR to reactor powder polypropylene may be from 1.25:1 to 25:1, from 2:1 to 15:1 or from of 2.5:1 to 12:1. In certain embodiments, the amount of initiator may be adjusted to achieve the desired MFR.

In certain embodiments, the powder/initiator mixture may include an antioxidant, such as a primary antioxidant or a secondary antioxidant. As used herein, a primary antioxidant is a radical scavenger. Examples include sterically hindered phenols, such as Irganox 1010 (CAS 6683-19-8), Irganox 1076 (CAS 2082-79-3), Irganox 3114 (CAS 27676-62-6), Irganox 1330 (CAS 1709-70-2), and Cyanox 1790 (CAS 40601-76-1). As used herein, a secondary antioxidant is a hyperoxide decomposing compound. The secondary antioxidant may aid in reducing premature weight loss in the propylene homopolymer, particularly at elevated temperatures. Examples of secondary antioxidants include, but are not limited to phosphites, hindered amine stabilizers and hydroxylamines. Phenol-free antioxidants are suitable as well, such as for example those based on hindered amine stabilizers, phosphites, hydroxylamines. Examples of suitable secondary antioxidants are BNX DSTDP (Dioctadecyl 3,3'-thiodipropionate) (CAS 693-36-7), Irgafos 168 (CAS 31570-04-4), Doverphos S9228T (CAS 154862-43-8), Ultranox 626 (CAS 26741-53-7), Weston 618F (CAS 3806-34-6), TNPP (CAS 26523-78-4), Hostanox P-EPQ (CAS 119345-01-6), and Irgastab FS-042 (CAS 143925-92-2). The secondary antioxidant may be present in the powder/initiator mixture between, for instance, 0.1% to 3% by weight, between 0.2% and 1.5% by weight, or between 0.15% and 0.75% by weight.

In certain embodiments, talc may be added to the powder/initiator mixture. Talc may be present in the powder/initiator mixture between 0.1 wt % to 2 wt % or between 0.3% to 1%, all by weight. In certain embodiments, talc may increase the recrystallization temperature of the polypropylene.

In certain embodiments, by vis-breaking the reactor powder polypropylene in post-reactor forming, a higher MFR polypropylene may be formed without adversely affecting the production rate of the reactor powder polypropylene while maintaining the long term heat aging performance (LHTA) of the polypropylene. One measure of LHTA is Isothermal Thermo-Gravimetric Analysis (TGA). TGA measures weight loss of the polypropylene at an elevated temperature. To measure TGA, a sample is started at 25° C. steadily heated to 230° C. over 15 minutes. The sample is held at 230° C. for 4 hours. An air purge gas atmosphere is used throughout the procedure. Weight loss may be calculated based on difference between the weight of the sample after four hours compared to the initial weight of the sample. Results of TGA multiple measurement may be averaged. In one measure of TGA, the time at a pre-determined elevated temperature to achieve a predetermined weight loss may be found. In certain embodiments of the present disclosure, following post-reactor forming, at 230° C., have a 1% loss in weight from between 25 and 250 minutes, or between 50 and 150 minutes, a 2% loss in weight between 50 minutes and 300 minutes or between 75 and 200 minutes, and a 3% loss in weight between 50 minutes and 300 minutes or between 77 and 210 minutes.

Articles

In some embodiments, the pellets may be processed to make an article, such as by methods known to those of ordinary skill in the art. For example and without limitation, the pellets may be processed by injection molding, fiber extrusion, film extrusion, sheet extrusion, pipe extrusion, blow molding, rotomolding, slush molding, injection-stretch blow molding or extrusion-thermoforming to produce an article. The article may be a motor vehicle component, appliance, or filter media, for example.

EXAMPLES

The disclosure having been generally described, the following examples show particular embodiments of the disclosure. It is understood that the example is given by way of illustration and is not intended to limit the specification or the claims. All compositions percentages given in the examples are by weight.

Example 1

Samples of powder/initiator mixture were prepared in accordance with Table 1. Sample 1 is a comparative reactor grade 100 melt flow rate propylene homopolymer fluff. Samples 2-26 are a controlled rheology grade 30 melt flow propylene homopolymer fluff with xylene solubles targeted at 2 consistent with the present disclosure as described herein above.

TABLE 1

TOTAL PETROCHEMICALS ENHANCED HEAT STABILITY CRED PP WITH A HIGH MFR

| | 1 | 2 | 3 | 4 | 5 | 6 | 7 | 8 | 9 |
|---|---|---|---|---|---|---|---|---|---|
| DSTDP | 0.4 | 0.4 | 0.4 | 0.4 | 0.4 | 0.4 | 0.4 | 0.4 | 0.4 |
| Irganox 1010 | 0.45 | 0.45 | 0.45 | 0.45 | 0.45 | 0.45 | 0.45 | 0.45 | 0.45 |
| Irganox 1076 | 0.005 | 0.005 | 0.005 | 0.005 | 0.005 | 0.005 | 0.005 | 0.005 | 0.005 |
| Hydrotalcite | 0.07 | 0.07 | 0.07 | 0.07 | 0.07 | 0.07 | 0.07 | 0.07 | 0.07 |
| Irgafos 168 | 0.2 | 1.5 | 1.5 | 1.5 | | | 1.5 | 1.25 | 0.95 |
| Trigonox 301 | | 0.074 | 0.08 | 0.08 | 0.074 | 0.08 | 0.08 | 0.08 | 0.08 |
| IMI Fabi Talc BT | | | | 0.5 | | | | | |
| Doverphos S9228T | | | | | 0.75 | 0.75 | | | |

Sample #

| | 10 | 11 | 12 | 13 | 14 | 15 | 16 | 17 | 18 |
|---|---|---|---|---|---|---|---|---|---|
| DSTDP | 0.4 | 0.4 | 0.4 | 0.4 | 0.4 | 0.4 | 0.4 | 0.4 | 0.4 |
| Irganox 1010 | 0.45 | 0.45 | 0.45 | 0.45 | 0.45 | 0.45 | 0.45 | 0.45 | 0.45 |
| Irganox 1076 | 0.005 | 0.005 | 0.005 | 0.005 | 0.005 | 0.005 | 0.005 | 0.005 | 0.005 |
| Hydrotalcite | 0.07 | 0.07 | 0.07 | 0.07 | 0.07 | 0.07 | 0.07 | 0.07 | 0.07 |
| Irgafos 168 | 0.7 | | | | 0.95 | 0.95 | | | |
| Trigonox 301 | 0.08 | 0.08 | 0.08 | 0.08 | 0.08 | 0.08 | 0.08 | 0.08 | 0.08 |
| IMI Fabi Talc BT | | | | | 0.3 | 1 | 0.3 | 1 | |
| Doverphos S9228T | | 0.35 | 0.27 | 0.2 | | | 0.27 | 0.27 | 0.16 |

Sample #

| | 19 | 20 | 21 | 22 | 23 | 24 | 25 | 26 |
|---|---|---|---|---|---|---|---|---|
| DSTDP | 0.4 | 0.4 | 0.4 | 0.4 | 0.4 | 0.4 | 0.4 | 0.4 |
| Irganox 1010 | 0.45 | 0.45 | 0.45 | 0.45 | 0.45 | 0.45 | 0.45 | 0.45 |
| Irganox 1076 | 0.005 | 0.005 | 0.005 | 0.005 | 0.005 | 0.005 | 0.005 | 0.005 |
| Hydrotalcite | 0.07 | 0.07 | 0.07 | 0.07 | 0.07 | 0.07 | 0.07 | 0.07 |
| Irgafos 168 | | | 0.2 | | | | | 1.5 |
| Trigonox 301 | 0.08 | 0.08 | 0.08 | 0.07 | 0.08 | 0.09 | 0.08 | 0.08 |
| IMI Fabi Talc BT | 0.3 | 1 | | | | | | |
| Doverphos S9228T | 0.16 | 0.16 | | 0.27 | 0.27 | 0.27 | 0.2 | |

Values provided for components of the powder/initiator mixture are in weight percent of the total powder/initiator mixture weight. Trigonix 301, as used in Table 2, is based on a 41% mixture of Trigonix 301, e.g., a 800 ppm loading of 41% Trignoix 301 is 328 ppm of peroxide.

Example 2

Figure 2:
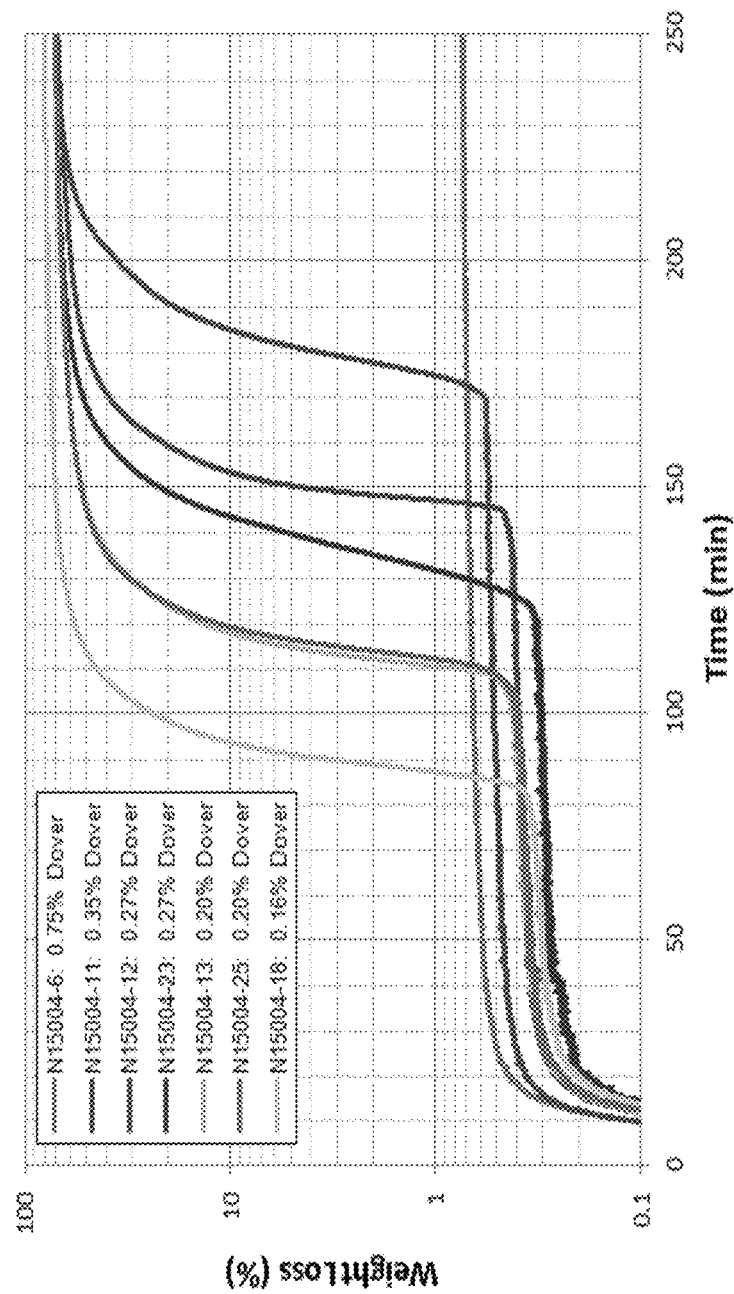
FIG. 2 is a graph of Percent Weight-Loss versus Time for Compounds with Doverphos S9228T consistent with certain embodiments of the present disclosure.
Figure 3:
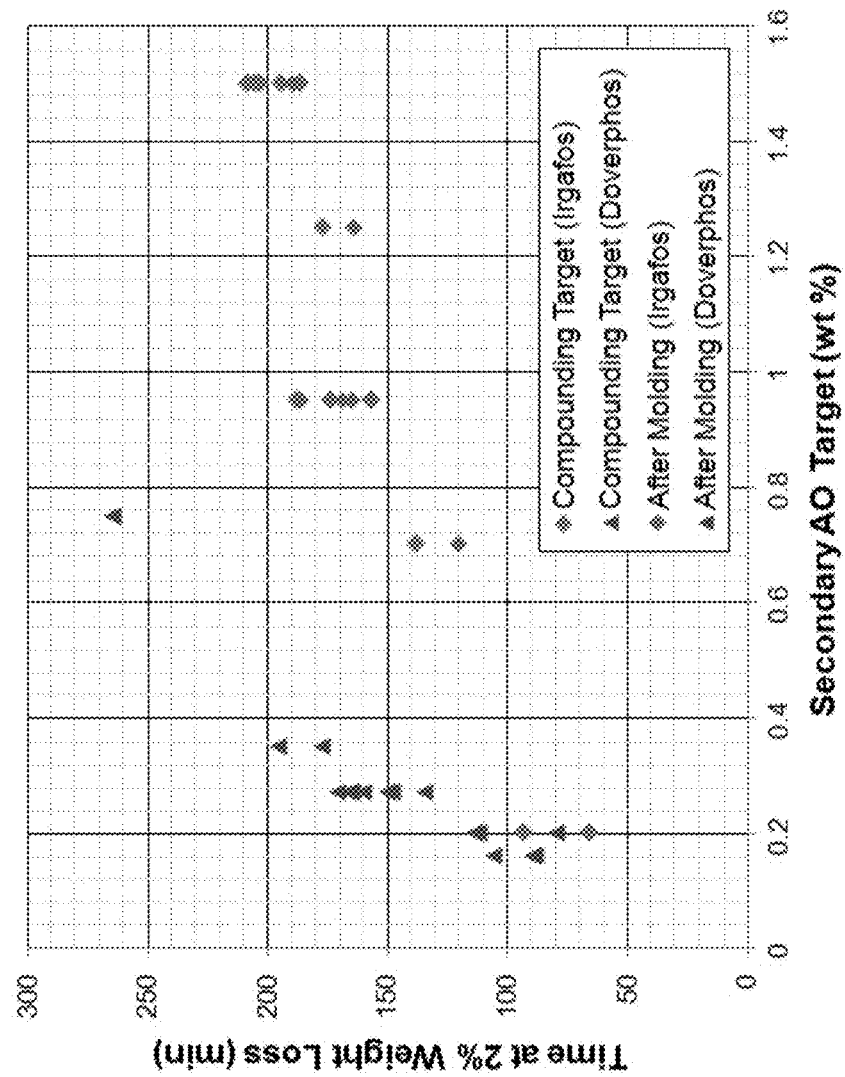
FIG. 3 is a graph of TGA Time at 2% Weight-loss versus Weight Percent of secondary antioxidant consistent with certain embodiments of the present disclosure.
Figure 4:
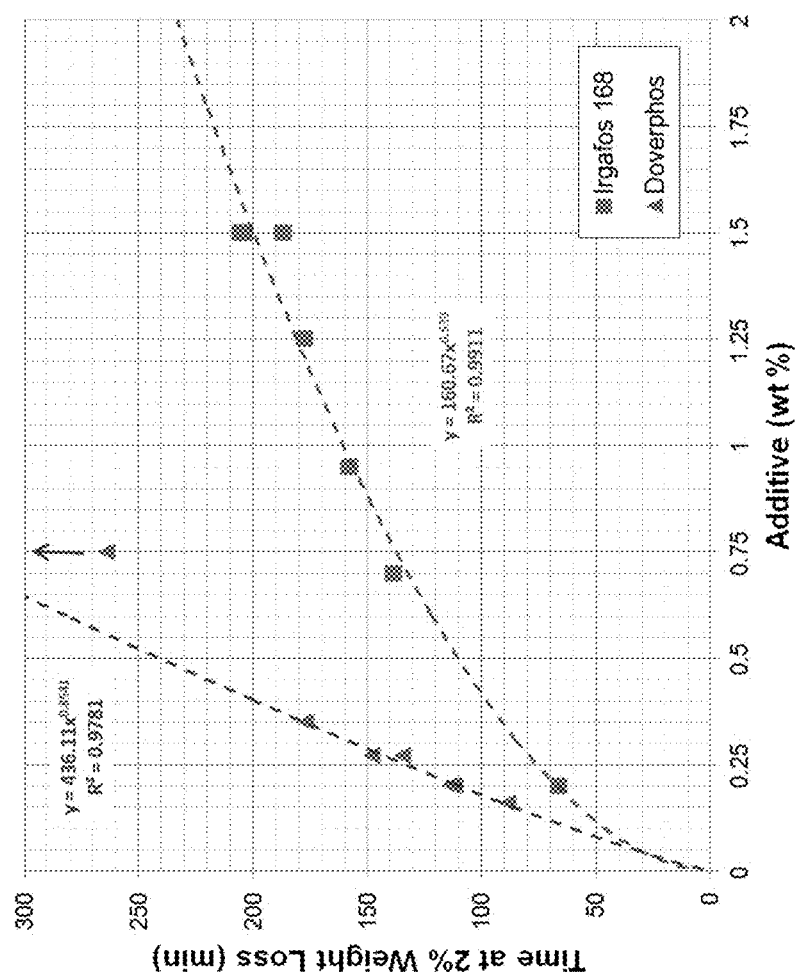
FIG. 4 is a graph of TGA Time at 2% Weight-loss versus secondary antioxidant with Curve-Fits consistent with certain embodiments of the present disclosure.

Samples from Example 1 were subjected to post-reactor forming and molding. Results are shown in Table 2:

Irgafos 168 (FIG. 1) and Doverphos 59228T (FIG. 2). Performance increases for increasing loading for both Irgafos 168) and Doverphos 59228T. Most loading levels studied exceeded the ~100 minute to 2% weight-loss that is typical of Sample 1. Irgafos 168 exhibits a greater initial weight-loss rate than the Doverphos 59228T. FIG. 3 depicts the Time at 2% Weight-Loss versus anti-oxidant weight for Irgafos 168 and Doverphos 59228T in pellet and molded form. FIG. 4 depicts compounds using no talc and 800 ppm

TABLE 2

| | Additives | | | | MFR | After Compounding | | | GC Active | After Molding | | | GC Active |
| | | | | | | GPC | | | | GPC | | | |
| # | Irgafos % | Trig % | Talc % | Dover % | MFR dg/min | Mn Daltons | Mw Daltons | Mz Daltons | Peroxide ppm | Mn Daltons | Mw Daltons | Mz Daltons | Peroxide ppm |
|---|---|---|---|---|---|---|---|---|---|---|---|---|---|
| 1 | 0.2 | | | | 103 | 22555 | 144293 | 686180 | | | | | |
| 2 | 1.5 | 0.074 | | | 102 | 30141 | 179651 | 625411 | | | | | |
| 3 | 1.5 | 0.08 | | | 116 | 30123 | 177736 | 607270 | | | | | |
| 4 | 1.5 | 0.08 | 0.5 | | 112 | 30117 | 178797 | 622089 | | | | | |
| 5 | | 0.074 | | 0.75 | 104 | 30096 | 178636 | 610805 | | | | | |
| 6 | | 0.08 | | 0.75 | 113 | 29762 | 179695 | 663599 | | | | | |
| 7 | 1.5 | 0.08 | | | 112 | 30904 | 188677 | 707374 | 227 | 30183 | 176105 | 608175 | 122.9 |
| 8 | 1.25 | 0.08 | | | 120 | 30637 | 188192 | 680674 | 224 | 30057 | 173057 | 576910 | 127.9 |
| 9 | 0.95 | 0.08 | | | 118 | 30956 | 183891 | 643708 | 230 | 30070 | 173565 | 581917 | 126.5 |
| 10 | 0.7 | 0.08 | | | 130 | 30828 | 184539 | 647249 | 222 | 30040 | 171494 | 575858 | 121 |
| 11 | | 0.08 | | 0.35 | 122 | 30624 | 184850 | 662387 | 224 | 29757 | 167825 | 548760 | 116.8 |
| 12 | | 0.08 | | 0.27 | 124 | 30630 | 186673 | 677449 | 228 | 29216 | 155300 | 479965 | 95.5 |
| 13 | | 0.08 | | 0.2 | 130 | 30767 | 184756 | 657247 | 222 | 29810 | 165165 | 522529 | 111.7 |
| 14 | 0.95 | 0.08 | 0.3 | | 130 | 30811 | 190011 | 761662 | 237 | 30284 | 180774 | 632070 | 143 |
| 15 | 0.95 | 0.08 | 1 | | 130 | 30781 | 188180 | 686716 | 238 | 30331 | 176347 | 595963 | 121.2 |
| 16 | | 0.08 | 0.3 | 0.27 | 134 | 30541 | 184066 | 670980 | | 30018 | 164549 | 519389 | |
| 17 | | 0.08 | 1 | 0.27 | 124 | 30446 | 182072 | 644894 | | 30109 | 166058 | 525467 | |
| 18 | | 0.08 | | 0.16 | 120 | 30548 | 189579 | 709814 | | 30361 | 172528 | 568530 | |
| 19 | | 0.08 | 0.3 | 0.16 | 110 | 30551 | 186276 | 683907 | | 30242 | 171094 | 568825 | |
| 20 | | 0.08 | 1 | 0.16 | 130 | 30517 | 183947 | 668936 | | 30078 | 166009 | 531130 | |
| 21 | 0.2 | 0.08 | | | 133 | 30537 | 187328 | 730193 | | | | | |
| 22 | | 0.07 | | 0.27 | 102 | 30557 | 184081 | 660742 | 188 | | | | |
| 23 | | 0.08 | | 0.27 | 121 | 30821 | 185897 | 662044 | 197 | | | | |
| 24 | | 0.09 | | 0.27 | 138 | 30696 | 184648 | 675854 | 260 | | | | |
| 25 | | 0.08 | | 0.2 | 130 | 30652 | 185801 | 690027 | | | | | |
| 26 | 1.5 | 0.08 | | | 121 | 30735 | 187231 | 683896 | | | | | |

The effect of peroxide on long term heat performance is shown in the data presented in Tables 3 and 9. TGA measurement and DSC results for the Samples from Example 1 are shown in Table 3.

The TGA data is presented in the format Weight-Loss versus Exposure Time at 230° C. for compounds containing of Trigonox 301. Doverphos 59228T generally outperforms Irgafos 168 by a ratio of 3:1 with identical additive weight.

Figure 5:
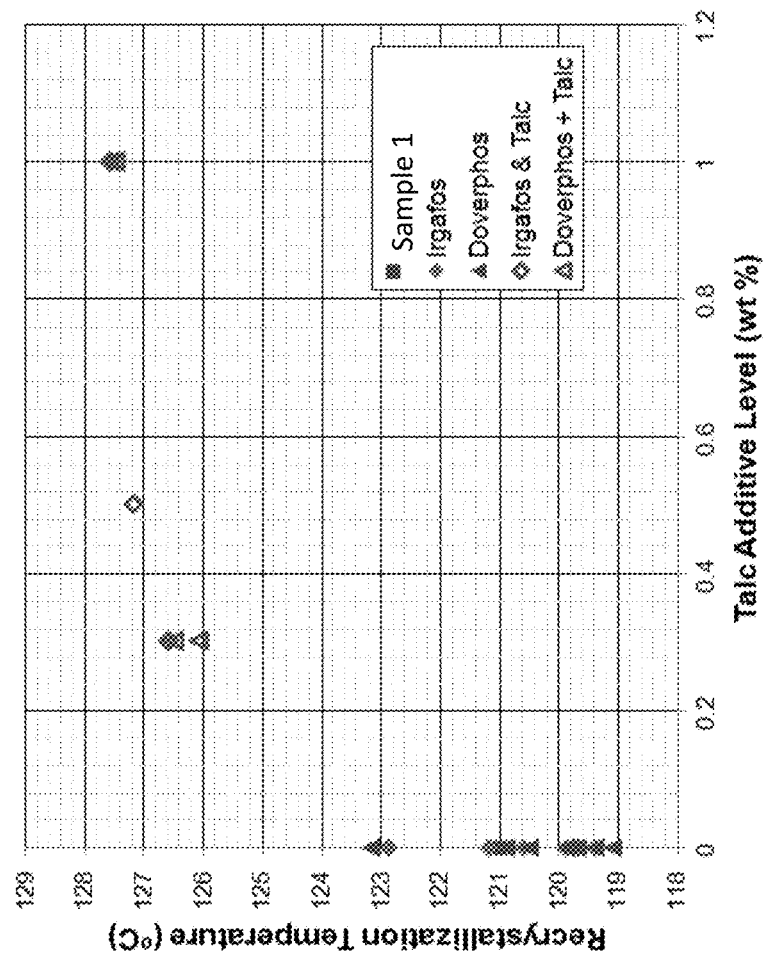
FIG. 5 is a graph of Recrystallization Temperature versus Weight Percent of Talc consistent with certain embodiments of the present disclosure.

FIG. 5 illustrates the recrystallization temperature versus talc loading. FIG. 5 shows that including talc increases the recrystallization temperature by 3-8° C.

TABLE 3

| | Additives | | | | After Compounding | | | | | | After Molding | | | | | |
| | | | | | TGA Time at 2% wt. loss min | DSC | | | | | TGA Time at 2% wt. loss min | DSC after Molding | | | | |
| # | Irgafos % | Trig % | Talc % | Dover % | | 2nd Melt Peak °C. | □H2 Melt J/g | Recry Peak °C. | □H Recry J/g | % Crystal % | | 2nd Melt Peak °C. | □H2 Melt J/g | Recry Peak °C. | □H Recry J/g | % Crystal % |
|---|---|---|---|---|---|---|---|---|---|---|---|---|---|---|---|---|
| 1 | 0.2 | | | | 94 | 164 | 105 | 121 | 102 | 50.4 | | | | | | |
| 2 | 1.5 | 0.074 | | | 172 | 164 | 104 | 120 | 100 | 49.5 | | | | | | |
| 3 | 1.5 | 0.08 | | | 198 | 164 | 104 | 120 | 100 | 49.6 | | | | | | |
| 4 | 1.5 | 0.08 | 0.5 | | 200 | 165 | 108 | 127 | 102 | 51.5 | | | | | | |
| 5 | | 0.074 | | 0.75 | 265 | 165 | 107 | 121 | 104 | 51.1 | | | | | | |
| 6 | | 0.08 | | 0.75 | 265 | 164 | 101 | 120 | 99 | 48.4 | | | | | | |
| 7 | 1.5 | 0.08 | | | 204 | 164 | 111 | 123 | 107 | 52.9 | 190 | 163 | 111 | 123 | 107 | 53 |

TABLE 3-continued

| | Additives | | | | After Compounding | | | | | | After Molding | | | | | |
|---|---|---|---|---|---|---|---|---|---|---|---|---|---|---|---|---|
| | | | | | TGA Time at 2% wt. loss min | DSC | | | | | TGA Time at 2% wt. loss min | DSC after Molding | | | | |
| | | | | | | 2nd Melt Peak °C. | ΔH2 Melt J/g | Recry Peak °C. | ΔH Recry J/g | % Crystal % | | 2nd Melt Peak °C. | ΔH2 Melt J/g | Recry Peak °C. | ΔH Recry J/g | % Crystal % |
| # | Irgafos % | Trig % | Talc % | Dover % | | | | | | | | | | | | |
| 8 | 1.25 | 0.08 | | | 178 | 163 | 110 | 121 | 106 | 52.4 | 164 | 162 | 112 | 121 | 108 | 53.3 |
| 9 | 0.95 | 0.08 | | | 166 | 163 | 109 | 120 | 104 | 52.2 | 186 | 162 | 112 | 120 | 107 | 53.3 |
| 10 | 0.7 | 0.08 | | | 139 | 162 | 109 | 119 | 107 | 52.2 | 121 | 163 | 109 | 119 | 105 | 52.1 |
| 11 | | 0.08 | | 0.35 | 177 | 162 | 111 | 120 | 108 | 52.9 | 196 | 162 | 111 | 120 | 107 | 52.9 |
| 12 | | 0.08 | | 0.27 | 148 | 162 | 110 | 119 | 108 | 52.8 | 166 | 162 | 110 | 119 | 106 | 52.7 |
| 13 | | 0.08 | | 0.2 | 112 | 162 | 111 | 119 | 109 | 53.0 | 80 | 161 | 111 | 119 | 109 | 53.3 |
| 14 | 0.95 | 0.08 | 0.3 | | 181 | 164 | 112 | 127 | 109 | 53.6 | 169 | 164 | 113 | 127 | 110 | 54.3 |
| 15 | 0.95 | 0.08 | 1 | | 174 | 164 | 113 | 128 | 109 | 53.8 | 165 | 164 | 114 | 128 | 110 | 54.6 |
| 16 | | 0.08 | 0.3 | 0.27 | 161 | 164 | 112 | 127 | 109 | 53.7 | 165 | 164 | 129 | 127 | 126 | 61.7 |
| 17 | | 0.08 | 1 | 0.27 | 148 | 164 | 114 | 128 | 110 | 54.4 | 164 | 128 | 128 | 123 | 61.1 | |
| 18 | | 0.08 | | 0.16 | 77 | 163 | 115 | 123 | 110 | 55.0 | 165 | 121 | 122 | 121 | 57.8 | |
| 19 | | 0.08 | 0.3 | 0.16 | 77 | 165 | 114 | 126 | 109 | 54.4 | 165 | 126 | 126 | 121 | 60.1 | |
| 20 | | 0.08 | 1 | 0.16 | 92 | 164 | 113 | 128 | 109 | 53.8 | 167 | 120 | 127 | 119 | 57.3 | |
| 21 | 0.2 | 0.08 | | | 66 | 162 | 115 | 121 | 110 | 55.0 | | | | | | |
| 22 | | 0.07 | | 0.27 | 150 | 163 | 112 | 120 | 109 | 53.7 | | | | | | |
| 23 | | 0.08 | | 0.27 | 135 | 162 | 116 | 121 | 111 | 55.3 | | | | | | |
| 24 | | 0.09 | | 0.27 | 135 | 162 | 113 | 120 | 109 | 54.1 | | | | | | |
| 25 | | 0.08 | | 0.2 | 114 | 162 | 113 | 121 | 109 | 54.0 | | | | | | |
| 26 | 1.5 | 0.08 | | | 206 | 162 | 111 | 120 | 109 | 53.1 | | | | | | |

Table 4 depict a subset of data from Table 3. As shown in Table 4, the controlled rheology sample #21 matches sample #1 in formulation, except with Trigonox 301 peroxide addition to increase the MFR from 30 to the 100 MFR target. With the balance of the additive package held constant, TGA is reduced to 66 minutes in comparison to the reactor grade #1 baseline of 94 minutes. An antagonistic effect exists between vis-breaking and long term heat stability. As shown with respect to sample #18, a similar effect is observed when using Doverphos S9228T at a similar loading level of 1600 ppm, even though Doverphos S9228T shows much higher efficacy in conventional polymer formulations. Replacing 2000 ppm Irgafos 168 with 1600 ppm Doverphos S9228T is not sufficient to match sample 1 performance. Only by using a 1:1 replacement of Doverphos S9228T for Irgafos 168, as shown with sample #13, does a vis-broken PP formulation match or exceed that of the sample #1 baseline.

TABLE 4

| | Additives | | | | TGA Time at 2% wt. loss min |
|---|---|---|---|---|---|
| # | Irgafos 168 % | Trig. 301 % | Talc % | Dover. S9228T % | |
| 1 | 0.2 | | | | 94 |
| 21 | 0.2 | 0.08 | | | 66 |
| 18 | | 0.08 | | 0.16 | 77 |
| 13 | | 0.08 | | 0.2 | 112 |

As shown in Table 5, increasing Irgafos 168 leads to a TGA result that exceeds sample #1's TGA measurement of 94 minutes. Using the results of samples #7, #8, #9, #10 and #21, an interpolated TGA time of 94 minutes is determined at 0.425% Irgafos 168. However, at 0.08% Trigonox 301 this yields a 131 MFR, well above the 100 MFR target of sample #1.

TABLE 5

| | Additives | | | | | |
|---|---|---|---|---|---|---|
| # | Irgafos 168 % | Trig. 301 % | Talc % | Dover. S9228T % | TGA Time at 2% wt. loss min | MFR MFR dg/min |
| 1 | 0.2 | | | | 94 | 103 |
| 21 | 0.2 | 0.08 | | | 66 | 133 |
| 10 | 0.7 | 0.08 | | | 139 | 130 |
| 9 | 0.95 | 0.08 | | | 166 | 118 |
| 8 | 1.25 | 0.08 | | | 178 | 120 |
| 7 | 1.5 | 0.08 | | | 204 | 112 |
| Interpolated Fit | 0.425 | 0.08 | | | 94 | 131 |

Table 6 depicts samples #2, #3, and #26 and an interpolated fit using 0.45% Irgafos 168 and 0.068% Trigonox 301, yielding a balance of TGA performance and a nominal 100 MFR pellet. These results matching the Sample #1.

TABLE 6

| | Additives | | | | | |
|---|---|---|---|---|---|---|
| # | Irgafos 168 % | Trig. 301 % | Talc % | Dover. S9228T % | TGA Time at 2% wt. loss min | MFR MFR dg/min |
| 1 | 0.2 | | | | 94 | 103 |
| 21 | 0.2 | 0.08 | | | 66 | 133 |
| 10 | 0.7 | 0.08 | | | 139 | 130 |
| 9 | 0.95 | 0.08 | | | 166 | 118 |
| 8 | 1.25 | 0.08 | | | 178 | 120 |
| 7 | 1.5 | 0.08 | | | 204 | 112 |
| 3 | 1.5 | 0.08 | | | 198 | 116 |
| 26 | 1.5 | 0.08 | | | 206 | 121 |
| 2 | 1.5 | 0.074 | | | 172 | 102 |
| Interpolated Fit | 0.45 | 0.068 | | | 98 | 102 |

Achieving a balance of TGA performance and a nominal 100 MFR pellet is shown in Table 7 with Doverphos S9228T, a higher performance phosphite-based melt stabilizer. Higher performance melt stabilizers may reduce the amount of additive used. For example, adding >0.4% Irgafos 168 could present additive feeding challenges and problems with product consistency. If a high performance antioxidant can be used for similar efficacy as, for instance, Irgafos 168, industrial performance may improve.

The results in Table 7 use of a high performance antioxidant like Doverphos S9228T. As shown in Table 7, an interpolated fit to the data indicate similar efficacy at only ~33% the loading needed with Irgafos 168. Adding 0.16% Doverphos S9228T would be similar to adding 0.2% Irgafos 168, making use of Doverpos S9228T feasible. Table 7 show a match of Sample #1 TGA and MFR measurements using a balance of peroxide and Doverphos S9228T.

TABLE 7

| | Additives | | | | | TGA Time at 2% | |
|---|---|---|---|---|---|---|---|
| # | Irgafos 168 % | Trig. 301 % | Talc % | Dover. S9228T % | wt. loss min | MFR MFR dg/min | |
| 1 | 0.2 | | | | 94 | 103 | |
| 22 | | 0.07 | | 0.27 | 150 | 102 | |

TABLE 7-continued

| | Additives | | | | | TGA Time at 2% | |
|---|---|---|---|---|---|---|---|
| # | Irgafos 168 % | Trig. 301 % | Talc % | Dover. S9228T % | wt. loss min | MFR MFR dg/min | |
| 23 | | 0.08 | | 0.27 | 135 | 121 | |
| 24 | | 0.09 | | 0.27 | 135 | 138 | |
| 25 | | 0.08 | | 0.2 | 114 | 130 | |
| 11 | | 0.08 | | 0.35 | 177 | 122 | |
| 12 | | 0.08 | | 0.27 | 148 | 124 | |
| 13 | | 0.08 | | 0.2 | 112 | 130 | |
| 18 | | 0.08 | | 0.16 | 77 | 120 | |
| Interpolated Fit | | 0.065 | | 0.16 | 99 | 99 | |

In certain embodiments, it may be desirable to manufacture molded parts from CRed polypropylene that have LTHA performance that matches or exceeds that of sample #1. The results, set forth in Table 8, demonstrate such performance with an additive package. After molding, all compounds but one retain TGA values higher than that of sample #1. Adding an additional melt processing step and consuming more residual active peroxide is tenable. Any modest loss in TGA performance between compounding and molding as shown in Table 8 may be compensated by formulation optimization.

TABLE 8

| | After Compounding | | | | | After Molding | | | | |
|---|---|---|---|---|---|---|---|---|---|---|
| | GPC | | | GC Active | TGA Time at 2% wt. | GPC | | | GC Active | TGA Time at 2% wt. |
| # | Mn Daltons | Mw Daltons | Mz Daltons | Peroxide Ppm | loss min | Mn Daltons | Mw Daltons | Mz Daltons | Peroxide ppm | loss min |
| 7 | 30904 | 188677 | 707374 | 227 | 204 | 30183 | 176105 | 608175 | 122.9 | 190 |
| 8 | 30637 | 188192 | 680674 | 224 | 178 | 30057 | 173057 | 576910 | 127.9 | 164 |
| 9 | 30956 | 183891 | 643708 | 230 | 166 | 30070 | 173565 | 581917 | 126.5 | 186 |
| 10 | 30828 | 184539 | 647249 | 222 | 139 | 30040 | 171494 | 575858 | 121 | 121 |
| 11 | 30624 | 184850 | 662387 | 224 | 177 | 29757 | 167825 | 548760 | 116.8 | 196 |
| 12 | 30630 | 186673 | 677449 | 228 | 148 | 29216 | 155300 | 479965 | 95.5 | 166 |
| 13 | 30767 | 184756 | 657247 | 222 | 112 | 29810 | 165165 | 522529 | 111.7 | 80 |
| 14 | 30811 | 190011 | 761662 | 237 | 181 | 30284 | 180774 | 632070 | 143 | 169 |
| 15 | 30781 | 188180 | 686716 | 238 | 174 | 30331 | 176347 | 595963 | 121.2 | 165 |

Tensile strength, flexural modulus and HDT were measured for samples selected from Example 2. The results are shown in Table 9. As shown in Table 9, tensile strength at yield, HDT of samples #2-#20, the controlled rheology polymer subject to post reaction forming of the present disclosure, are consistent with that of sample #1, the comparative reactor grade 100 melt flow rate propylene. Specifically, in applications requiring the modulus and HDT value to match sample 1, use of a nucleating agent like talc in these examples achieves that requirement without adversely impacting TGA or MFR performance.

TABLE 9

| | | | | | Tensile | | | | | Flex | | HDT |
|---|---|---|---|---|---|---|---|---|---|---|---|---|
| Compound | Irgafos % | Trig % | Talc % | Dover % | Tensile Modulus ksi | Stress @Yield psi | Strain @Yield % | Stress @Break psi | Strain @Break % | Flex Modulus kpsi | Std. Dev. kpsi | HDT Value ° F. |
| 1 | 0.2 | | | | 252.7 | 5271 | 5.9 | 5015 | 8 | 228 | 1.7 | 239 |
| 2 | 1.5 | | 0.074 | | | | | | | | | |

TABLE 9-continued

|  |  |  |  |  | Tensile | | | | | Flex | | HDT |
|---|---|---|---|---|---|---|---|---|---|---|---|---|
| Compound | Irgafos % | Trig % | Talc % | Dover % | Tensile Modulus ksi | Stress @Yield psi | Strain @Yield % | Stress @Break psi | Strain @Break % | Flex Modulus kpsi | Std. Dev. kpsi | HDT Value ° F. |
| 3 | 1.5 | 0.08 |  |  | 241.1 | 5152 | 6.8 | 4513 | 11 | 205 | 3.8 | 219 |
| 4 | 1.5 | 0.08 | 0.5 |  | 264.4 | 5333 | 5.9 | 4617 | 10 | 235 | 2.6 |  |
| 5 |  | 0.074 |  | 0.75 |  |  |  |  |  |  |  |  |
| 6 |  | 0.08 |  | 0.75 | 247.3 | 5258 | 6.5 | 4715 | 11 | 211 | 2 | 225 |
| 7 | 1.5 | 0.08 |  |  | 247.3 | 5261 | 6.7 | 3624 | 14 | 220 | 3.7 | 234 |
| 8 | 1.25 | 0.08 |  |  | 237.4 | 5132 | 6.9 | 3822 | 14 | 206 | 1.8 | 224 |
| 9 | 0.95 | 0.08 |  |  | 234.5 | 5126 | 7.1 | 3764 | 15 | 204 | 2.5 | 219 |
| 10 | 0.7 | 0.08 |  |  | 237.0 | 5157 | 7 | 4062 | 14 | 207 | 3.5 | 218 |
| 11 |  | 0.08 |  | 0.35 | 238.4 | 5172 | 6.8 | 4105 | 13 | 208 | 2.6 | 217 |
| 12 |  | 0.08 |  | 0.27 | 235.7 | 5149 | 6.9 | 4090 | 14 | 202 | 3.2 | 218 |
| 13 |  | 0.08 |  | 0.2 | 231.2 | 5105 | 7.1 | 4078 | 14 | 204 | 2.5 | 213 |
| 14 | 0.95 | 0.08 | 0.3 |  | 254.6 | 5347 | 6.3 | 4332 | 11 | 229 | 3.6 | 240 |
| 15 | 0.95 | 0.08 | 1 |  | 258.5 | 5312 | 6 | 4524 | 11 | 238 | 1.4 | 243 |
| 16 |  | 0.08 | 0.3 | 0.27 | 273.3 | 5438 | 5.8 | 4660 | 11 | 240 | 4 |  |
| 17 |  | 0.08 | 1 | 0.27 | 280.3 | 5419 | 5.4 | 4743 | 9 | 249 | 2.1 |  |
| 18 |  | 0.08 |  | 0.16 | 264.3 | 5402 | 6.2 | 4289 | 11 | 230 | 1.1 |  |
| 19 |  | 0.08 | 0.3 | 0.16 | 273.9 | 5448 | 5.7 | 4687 | 10 | 239 | 5.2 |  |
| 20 |  | 0.08 | 1 | 0.16 | 281.1 | 5426 | 5.4 | 4674 | 10 | 245 | 2.5 |  |

Certain TGA and MFR performance only, as shown above, will meet some application needs, but other applications will require a performance level in other physical properties. These physical properties include stiffness, tensile stress at yield and heat deflection temperature. As shown in Table 9 and highlighted in the following table below, the Cred grades often are slightly lower than the Sample #1 comparative. As shown in Table 10, modulus for certain samples is 10 to 20 kpsi lower, tensile strain at yield averages 0.9% higher and HDT averages 18° F. lower than sample #1.

TABLE 10

| Compound | Irgafos 168 % | Trig. 301 % | Talc % | Dover. S9228T % | Tensile Modulus ksi | Stress @Yield psi | Strain @Yield % | Flex Modulus kpsi | HDT Value ° F. | Time at 2% wt. loss min | MFR dg/min |
|---|---|---|---|---|---|---|---|---|---|---|---|
| 1 | 0.2 |  |  |  | 252.7 | 5271 | 5.9 | 228 | 239 | 94 | 103 |
| 3 | 1.5 | 0.08 |  |  | 241.1 | 5152 | 6.8 | 205 | 219 | 198 | 116 |
| 6 |  | 0.08 |  | 0.75 | 247.3 | 5258 | 6.5 | 211 | 225 | 265 | 113 |
| 7 | 1.5 | 0.08 |  |  | 247.3 | 5261 | 6.7 | 220 | 234 | 204 | 112 |
| 8 | 1.25 | 0.08 |  |  | 237.4 | 5132 | 6.9 | 206 | 224 | 178 | 120 |
| 9 | 0.95 | 0.08 |  |  | 234.5 | 5126 | 7.1 | 204 | 219 | 166 | 118 |
| 10 | 0.7 | 0.08 |  |  | 237.0 | 5157 | 7 | 207 | 218 | 139 | 130 |
| 11 |  | 0.08 |  | 0.35 | 238.4 | 5172 | 6.8 | 208 | 217 | 177 | 122 |
| 12 |  | 0.08 |  | 0.27 | 235.7 | 5149 | 6.9 | 202 | 218 | 148 | 124 |
| 13 |  | 0.08 |  | 0.2 | 231.2 | 5105 | 7.1 | 204 | 213 | 112 | 130 |
| 18 |  | 0.08 |  | 0.16 | 264.3 | 5402 | 6.2 | 230 |  | 77 | 120 |
| Average for vis-broken compounds: |  |  |  |  | 241.4 | 5191 | 6.8 | 210 | 221 | 166 | 121 |

In certain samples, talc was used as a nucleator although other nucleators are permissible. Adding talc improved stiffness, yield stress and HDT, which, on average as shown below in Table 11, exceeded those of the sample #1 reactor grade comparative. Likewise, strain at yield was reduced to 5.8% on average, closely resembling sample #1. No antagonistic effects were observed in TGA or MFR results. The use of a nucleator, such as talc, makes it possible to make a vis-broken LTHA PP compound that mirrors sample 1 for long term thermal stability, MFR, stiffness, TGA and percent strain at yield.

TABLE 11

| Compound | Irgafos 168 % | Trig. 301 % | Talc % | Dover. S9228T % | Tensile Modulus ksi | Stress @Yield psi | Strain @Yield % | Flex Modulus kpsi | HDT Value °F. | Time at 2% wt. loss min | MFR dg/min |
|---|---|---|---|---|---|---|---|---|---|---|---|
| 1 | 0.2 | | | | 252.7 | 5271 | 5.9 | 228 | 239 | 94 | 103 |
| 4 | 1.5 | 0.08 | 0.5 | | 264.4 | 5333 | 5.9 | 235 | | 200 | 112 |
| 14 | 0.95 | 0.08 | 0.3 | | 254.6 | 5347 | 6.3 | 229 | 240 | 181 | 130 |
| 15 | 0.95 | 0.08 | 1 | | 258.5 | 5312 | 6 | 238 | 243 | 174 | 130 |
| 16 | | 0.08 | 0.3 | 0.27 | 273.3 | 5438 | 5.8 | 240 | | 161 | 134 |
| 17 | | 0.08 | 1 | 0.27 | 280.3 | 5419 | 5.4 | 249 | | 148 | 124 |
| 19 | | 0.08 | 0.3 | 0.16 | 273.9 | 5448 | 5.7 | 239 | | 77 | 110 |
| 20 | | 0.08 | 1 | 0.16 | 281.1 | 5426 | 5.4 | 245 | | 92 | 130 |
| Average for vis-broken compounds w/ talc: | | | | | 269.4 | 5389 | 5.8 | 239.3 | 241.5 | 148 | 124 |

Example 3

A 30 melt flow rate propylene homopolymer fluff was produced in a commercial reactor and subjected to post-reactor forming to achieve a 100 melt flow rate polypropylene. Multiple lots were tested. Results are shown in Table 12. Trigonix 301 was used as the peroxide, with the amount of peroxide in Trigonix 301 reflected in Table 12. The TGA data for the runs is presented in the format Weight-Loss versus Exposure Time at 230° C.

TABLE 12

| | Melt Flow | | Formulation | | | | TGA Weight | |
|---|---|---|---|---|---|---|---|---|
| | | | Irganox | | | Doverphos | Loss | Exposure |
| Name | Fluff MFR | Pellet MFR | 1010 (%) | DSTDP (%) | Peroxide (%) | S9228T (%) | Threshold % | Time (min) |
| Lot 1 | | 79.5 | 0.45 | 0.424 | 0.025 | 0.241 | 2 | 94.04 |
| Lot 2 | 28.09 | 87.9 | 0.45 | 0.392 | 0.025 | 0.240 | 2 | 93.18 |
| Lot 3 | 35.33 | 94.4 | 0.45 | 0.432 | 0.025 | 0.245 | 2 | 97.76 |
| Lot 4 | 34.07 | 107.7 | 0.45 | 0.504 | 0.025 | 0.250 | 2 | 90.01 |
| Lot 5 | 34.07 | 105.1 | 0.45 | 0.444 | 0.025 | 0.245 | 2 | 89.67 |
| Lot 6 | 33.85 | 102.2 | 0.45 | 0.392 | 0.025 | 0.240 | 2 | 87.25 |
| Average | 33.082 | 96.13833 | 0.45 | 0.431333 | 0.025 | 0.243542 | 2 | 91.985 |

As shown in Table 12, TGA performance for 30 melt flow rate propylene homopolymer fluff produced in a commercial reactor and subjected to post-reactor forming to achieve a 100 melt flow rate polypropylene is consistent with Sample 1 of Examples 1 and 2.

Example 4

Samples of a 30 melt flow propylene homopolymer fluff with xylene solubles targeted at 2 were mixed with the additive packages as shown below in Table 13. The TGA data is presented in the format Weight-Loss versus Exposure Time at 230° C.

TABLE 13

| Sample | Description | TGA at 2% (min) |
|---|---|---|
| A | Lupersol 101 + no secondary antioxidant | 15.13 |
| B | Trignox 301 + 0.05% Irg 168 (no peroxide) | 15.05 |
| C | no Peroxide + no secondary antioxidant | 14.94 |

As is shown in Table 13, an unbalanced additive package in combination with the homopolymer fluff, i.e., with peroxide but without a secondary antioxidant, or without peroxide but with antioxidants, or without peroxide or antioxidants does not perform as shown above with properly balanced additive packages. Specifically, samples with the unbalanced additive package in combination the homopolymer fluff have much lower TGA performance than sample 1 and samples 20-26.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:
1. A process for forming a high melt flow rate (MFR) polypropylene comprising:
   providing a reactor powder polypropylene, wherein the reactor powder polypropylene comprises a nucleator comprising talc, and wherein the reactor powder poly- propylene has a MFR of less than 100 dg/min as determined by ASTM D1238;

mixing the reactor powder polypropylene with a free-radical initiator to form a powder/initiator mixture; and subjecting the powder/initiator mixture to post-reactor forming to form discrete particle comprising a vis-broken polypropylene as the high MFR polypropylene, wherein the vis-broken polypropylene has a MFR greater than the MFR of the reactor powder polypropylene and in a range of from 80 dg/min to 150 dg/min.

2. The process of claim 1, wherein the reactor powder polypropylene is a homopolymer, a random copolymer, or an impact copolymer.

3. The process of claim 1, wherein the reactor powder polypropylene has a MFR greater than or equal to 10 and less than 100 dg/min as measured by ASTM D1238.

4. The process of claim 1, wherein the nucleator further comprises silica, a metallic-silicate hydrate, an organic derivative of dibenzylidene sorbitol, a sorbitol acetal, or a combination thereof.

5. The process of claim 1, wherein the free radical initiator is an organic peroxide.

6. The process of claim 5, wherein organic peroxide is 3,6,9-triethyl-3,6,9-trimethyl-1,4,7-triperoxonane, or 2,5-bis(tert-butylperoxy)-2,5-dimethylhexane.

7. The process of claim 6, wherein the organic peroxide is 3,6,9-triethyl-3,6,9-trimethyl-1,4,7-triperoxonane and no 2,5-bis(tert-butylperoxy)-2,5-dimethylhexane is present.

8. The process of claim 5, wherein an amount of organic peroxide present in the powder/initiator mixture is between 50 ppm to 1500 ppm.

9. The process of claim 1, wherein a ratio of MFR of the vis-broken polypropylene to the reactor powder polypropylene is between 1.25:1 to 25:1.

10. The process of claim 9, wherein the ratio of MFR of the vis-broken polypropylene to the reactor powder polypropylene is between 2.5:1 to 12:1.

11. The process of claim 1, wherein the powder/initiator mixture is combined with a secondary antioxidant.

12. The process of claim 11, wherein the secondary antioxidant is a phosphite, hindered amine stabilizer or hydroxylamine.

13. The process of claim 12, wherein the secondary antioxidant is present in the powder/initiator mixture in an amount between 0.1% to 3 wt %.

14. The process of claim 1, wherein, following post-reactor forming, a TGA of the high MFR polypropylene at 230° C. has a 2% loss in weight of between 75 minutes and 200 minutes.

15. The process of claim 14, wherein, following post-reactor forming, the TGA of the high MFR polypropylene at 230° C. has a 3% loss in weight of between 77 minutes and 210 minutes.

16. The process of claim 1, wherein the post-reaction forming is accomplished by extrusion into pellets, compaction into a fused/physically bonded pellet, prill bead manufacturing, pastillation, or melt atomization.

17. A vis-broken polypropylene obtained by the process of claim 1.

18. The process of claim 1 further comprising forming the discrete particle into an article.

19. The process of claim 18, wherein the article is a motor vehicle component, appliance, or filter media.

20. A polymer article formed from the vis-broken polypropylene of claim 1.

21. The process of claim 1, wherein the MFR of the high MFR polypropylene is in a range of from about 100 dg/min to 150 dg/min.

22. A process for forming a high melt flow rate (MFR) polypropylene comprising:

providing a reactor powder polypropylene, the reactor powder polypropylene comprising a nucleator and having a MFR of less than 100 dg/min as determined by ASTM D1238;

mixing the reactor powder polypropylene with a free-radical initiator to form a powder/initiator mixture; and subjecting the powder/initiator mixture to post-reactor forming to form discrete particle comprising a vis-broken polypropylene as the high MFR polypropylene, wherein the vis-broken polypropylene has a MFR greater than the MFR of the reactor powder propylene and in a range of from 80 dg/min to 150 dg/min;

wherein the nucleator is talc and the talc is present in the reactor powder polypropylene in an amount between 500 ppm and 20,000 ppm.

23. The process of claim 22, wherein the MFR of the high MFR polypropylene is in a range of from about 100 dg/min to 150 dg/min.

24. A process for forming a high melt flow rate (MFR) polypropylene comprising:

providing a reactor powder polypropylene, the reactor powder polypropylene having a MFR of less than 100 dg/min as determined by ASTM D1238;

mixing the reactor powder polypropylene with a free-radical initiator to form a powder/initiator mixture; and subjecting the powder/initiator mixture to post-reactor forming to form discrete particle comprising a vis-broken polypropylene as the high MFR polypropylene, wherein the vis-broken polypropylene has a MFR greater than the MFR of the reactor powder polypropylene and in a range of from 80 dg/min to 150 dg/min;

wherein the powder/initiator mixture is combined with talc.

25. The process of claim 24, wherein the MFR of the high MFR polypropylene is in a range of from about 100 dg/min to 150 dg/min.

* * * * *